(12) United States Patent
Dekel et al.

(10) Patent No.: US 8,218,905 B2
(45) Date of Patent: Jul. 10, 2012

(54) METHOD, SYSTEM AND SOFTWARE PRODUCT FOR PROVIDING EFFICIENT REGISTRATION OF 3D IMAGE DATA

(75) Inventors: Doron Dekel, Toronto (CA); Raghavendra Chandrashekara, Toronto (CA)

(73) Assignee: Claron Technology Inc., Toronto (CA)

( * ) Notice: Subject to any disclaimer, the term of this patent is extended or adjusted under 35 U.S.C. 154(b) by 1157 days.

(21) Appl. No.: 11/871,298

(22) Filed: Oct. 12, 2007

(65) Prior Publication Data
US 2009/0097722 A1    Apr. 16, 2009

(51) Int. Cl.
*G06K 9/32*   (2006.01)
(52) U.S. Cl. ........ 382/294; 382/128; 382/276; 382/293; 382/295; 382/298; 128/922
(58) Field of Classification Search .................. None
See application file for complete search history.

(56) References Cited

U.S. PATENT DOCUMENTS

| | | | |
|---|---|---|---|
| 6,771,736 B2 * | 8/2004 | Sabol et al. ............... | 378/98.12 |
| 7,397,934 B2 * | 7/2008 | Bloch et al. ................ | 382/128 |
| 7,643,662 B2 * | 1/2010 | Gering ....................... | 382/128 |
| 7,948,503 B2 * | 5/2011 | Shekhar et al. ............ | 345/648 |
| 2002/0141626 A1 | 10/2002 | Caspi | |
| 2004/0015070 A1 * | 1/2004 | Liang et al. ................ | 600/407 |
| 2005/0013471 A1 * | 1/2005 | Snoeren et al. ............ | 382/131 |
| 2005/0065421 A1 * | 3/2005 | Burckhardt ................ | 600/407 |
| 2005/0111720 A1 | 5/2005 | Gurcan et al. | |
| 2005/0135707 A1 * | 6/2005 | Turek et al. ................ | 382/294 |
| 2005/0249398 A1 * | 11/2005 | Khamene et al. ........... | 382/154 |
| 2005/0249434 A1 * | 11/2005 | Xu et al. ..................... | 382/294 |
| 2007/0014456 A1 * | 1/2007 | Ramamurthy et al. ..... | 382/128 |
| 2007/0185498 A2 * | 8/2007 | Lavallee ..................... | 606/102 |
| 2007/0185544 A1 * | 8/2007 | Dawant et al. ............. | 607/45 |
| 2008/0044104 A1 * | 2/2008 | Gering ........................ | 382/294 |
| 2008/0050043 A1 * | 2/2008 | Hermosillo Valadez et al. ...................... | 382/294 |
| 2008/0161687 A1 * | 7/2008 | Suri et al. ................... | 600/437 |
| 2010/0152577 A1 * | 6/2010 | Young et al. ................ | 600/431 |

FOREIGN PATENT DOCUMENTS

WO    2006118548    11/2006

OTHER PUBLICATIONS

Rueckert et al, "Nonrigid Registration Using Free-Form Deformations: Application to Breast MR Images", Aug. 1999, IEEE Transactions on Medical Imaging, 18(8), pp. 712 - 721.*

Zitováet al., "Image registration methods: a survey", 2003, Image Vision Comput, 21(11), pp. 977-1000.*

(Continued)

*Primary Examiner* — Sath V Perungavoor
*Assistant Examiner* — Jason Heidemann
(74) *Attorney, Agent, or Firm* — Ian McMillan; Bereskin and Parr LLP

(57) ABSTRACT

The invention relates to a method, system and computer program product for registering 3D image data. It comprises (a) receiving a first 3D image and a second 3D image; (b) determining a rendering transform for applying to each of the first 3D image and the second 3D image; (c) applying the rendering transform to the first 3D image to provide a first 2D projection and to the second 3D image to provide a second 2D projection; and (d) determining an elastic registration for mapping locations of the first 2D projection to homologous locations in the second 2D projection.

23 Claims, 13 Drawing Sheets

OTHER PUBLICATIONS

Huesman et al. "Deformable Registration of Multi-Modal Data Including Rigid Structures", Jun. 2003, IEEE transactions on nuclear science, vol. 50, No. 3.*

Cain et al., "Projection-based image registration in the presence of fixed-pattern noise", 2001, IEEE Transactions on Image Processing, vol. 10, No. 12, pp. 1860-1872.*

Fred S. Azar et al.,"Joint analysis of non-concurrent magnetic resonance imaging and diffuse optical tomography of breast cancer". vol. 6434, Jan. 27, 2007 pp. 1-10.

D. Rueckert et al. "Nonrigid registration using free-form deformations: Appliction to breast MR images". vol. 18, No. 8, Aug. 1, 1999.

Ali Khamene et al."A novel projection based approach for medical image registration". Jan. 1, 2006, pp. 247-256.

Ho-Ming Chan et al."Efficient 3D-3D vascular registration based on multiple orthogonal 2D projections". Jun. 23, 2003, vol. 2717, pp. 301-310.

Wallis J.W. et al."Use of volume-rendered images in registration of nuclear medicine studies". vol. 3 Oct. 30, 1994, pp. 1429-1432.

Communication under Rule 73 issued on European Patent Application No. EP08166295, dated Jan. 18, 2011.

Communication Pursuant to Article 94(3) EPC issued on European patent application No. EP08166295.9, dated Oct. 12, 2011.

* cited by examiner

METHOD, SYSTEM AND SOFTWARE PRODUCT FOR PROVIDING EFFICIENT REGISTRATION OF 3D IMAGE DATA

FIELD

The present invention relates generally to computer-generated images and, more particularly, to a method for mapping locations in one 3-dimensional image to homologous locations in another 3-dimensional image.

BACKGROUND

Registration between volumetric images (data volumes) can involve mapping locations in 3-dimensional (3D) images to homologous locations in other 3D images. The capability of automatically performing elastic (or non-rigid) registration between volumetric images has many potential benefits, especially in medical applications where 3D images of patients are routinely acquired using CT, MRI, PET, SPECT and ultrasound scanners. Known methods for automatic 3D registration are described in U.S. Pat. No. 6,909,794 and WO2006118548 and references thereof and in the book "Handbook of Biomedical Image Analysis, volume 3: Registration Models" by Suri et al. (2005) and references thereof.

Many robust 3D registration methods are iterative: one or more initial guesses are generated and then refined by a directed search for mapping parameters that maximize a similarity metric. Typically a large amount of computation needs to be performed per iteration to derive new mapping vectors, resample at least one of the 3D images on a curved grid and compute a global similarity function. The number of initial starting points (guesses) and optimization iterations required to ensure success increases exponentially when the degree of similarity between the contents of the image volumes is low under a rigid mapping, for example when images from a patient are registered to an annotated atlas created using images of one or more other patients. Elastic 3D registration, therefore, has had only limited usefulness in clinical practice to date.

SUMMARY

According to a first aspect of the present invention, a method is provided for registering 3D image data comprising the steps of: (1) receiving a first 3D image and a second 3D image; (2) determining a rendering transform for applying to each of the first 3D image and the second 3D image; (3) applying the rendering transform to the first 3D image to provide a first 2D projection and to the second 3D image to provide a second 2D projection; and (4) determining an elastic registration for mapping locations of the first 2D projection to homologous locations in the second 2D projection.

According to another aspect of the present invention multiple rendering transforms are determined for applying to each of the first 3D image and the second 3D image; the multiple rendering transforms are applied to the first 3D image to provide multiple first 2D projections and to the second 3D image to provide multiple second 2D projections; and multiple elastic registrations are determined for mapping locations of the multiple first 2D projections to homologous locations in the multiple second 2D projections.

According to another aspect of the present invention, a system for registering 3D image data is provided comprising: a processor; and, a memory for storing a first 3D image, a second 3D image, and means for configuring the processor to perform the steps of (1) determining a rendering transform for applying to each of the first 3D image and the second 3D image; (2) applying the rendering transform to i) the first 3D image to provide a first 2D projection and ii) the second 3D image to provide a second 2D projection; and (3) determining an elastic registration for mapping locations of the first 2D projection to homologous locations in the second 2D projection.

According to another aspect of the present invention, a computer program product is provided for use on a computer system to register 3D image data, the computer program product comprising: a recording medium; and, means recorded on the medium for instructing the computer system to perform the steps of: (1) receiving a first 3D image and a second 3D image; (2) determining a rendering transform for applying to each of the first 3D image and the second 3D image; (3) applying the rendering transform to i) the first 3D image to provide a first 2D projection and ii) the second 3D image to provide a second 2D projection; and, (4) determining an elastic registration for mapping locations of the first 2D projection to homologous locations in the second 2D projection.

BRIEF DESCRIPTION OF THE DRAWINGS

Embodiments are described below in further detail, by way of example, with reference to the accompanying drawings, in which.

DETAILED DESCRIPTION

The described embodiments of the present invention relate to methods for registering 3D image data using 2D projections of the 3D images. In at least one embodiment the 3D images are computed tomography (CT) scans of two different patients where the first 3D image is a subset of the anatomy scanned in the second 3D image. The second 3D image may be a full head-to-toe scan and can be annotated with locations, curves and regions of special interest, forming a reference atlas, while the first 3D image may be of an unknown region in the body. By registering the first 3D image to the second 3D image, the locations, curves, and regions from the second 3D image can be copied to their homologous locations in the first 3D image, enabling the automation of many operations that would otherwise require extensive user interaction, such as organ segmentation and documentation.

Figure 1:
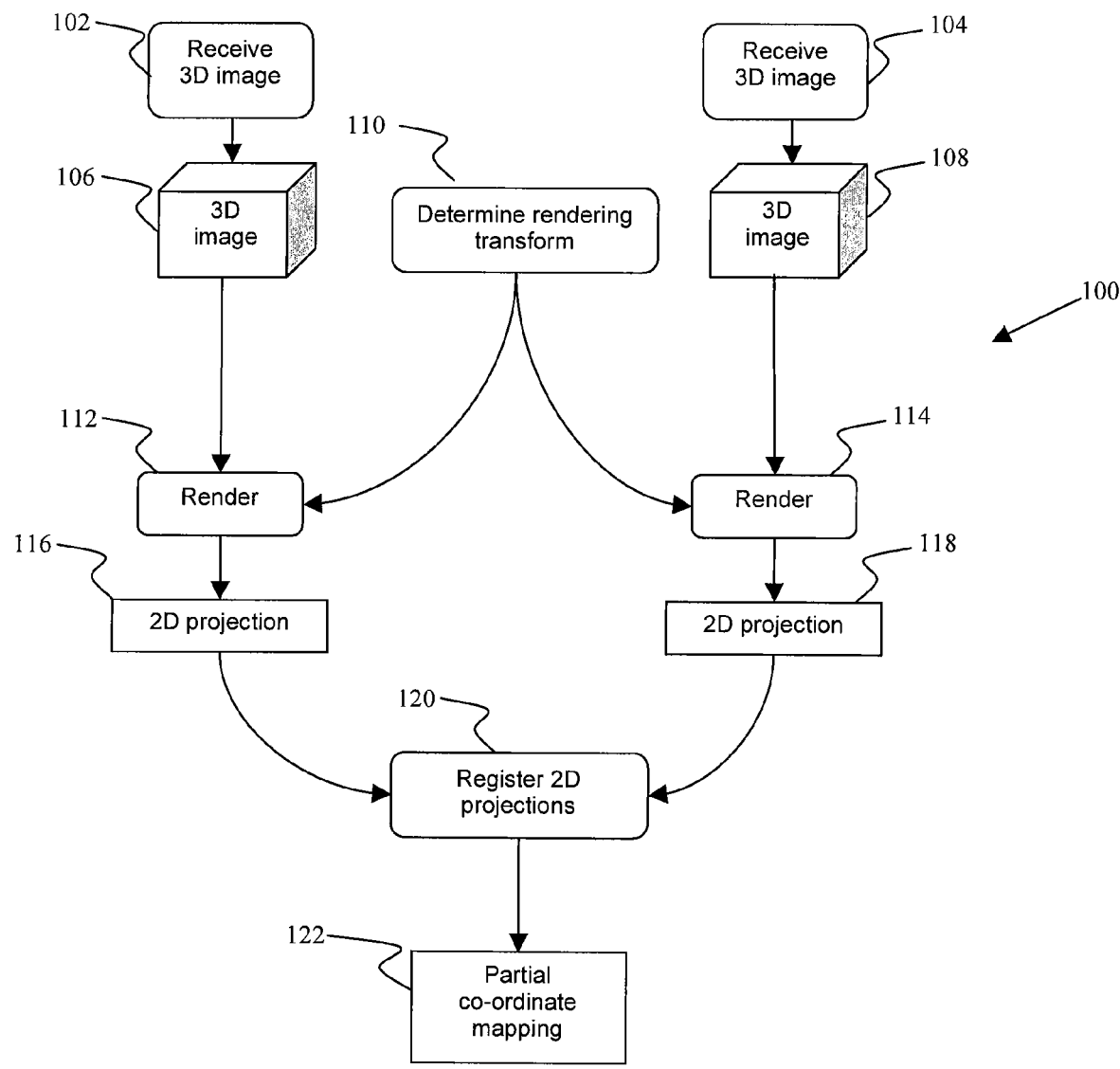
FIG. 1 is a flowchart of a method for registering 3D image data in accordance with an embodiment of the present invention.

Reference is now made to FIG. 1, in which a method 100 for registering 3D image data in accordance with an embodiment of the present invention is illustrated. In steps 102 and 104 a first 3D image 106 and a second 3D image 108 are received. In step 110 a rendering transform controlled by a number of rendering parameters is selected to apply to the 3D images 106 and 108. The values of the rendering parameters are selected based on the contents of the first and second 3D images 106 and 108 and the purpose of the registration. In steps 112 and 114 the rendering transform determined in step 110 is applied to the 3D images 106 and 108 to produce 2D projection images 116 and 118. In step 120 the two 2D projection images 116 and 118 are registered to produce an elastic registration 122 that maps locations in the second 2D projection 118 to homologous locations in the first 2D projection 116. Various of the steps of method 100 will be described in further detail below.

In step 110 of method 100 described above, a rendering transform is determined. Rendering can be described as the process of computing a 2D image from a 3D image. The 2D image may be computed by projection from a specified viewpoint or viewing direction. One common rendering technique is ray casting. In this technique, for each pixel in the 2D image a virtual ray is transmitted from a projection plane towards the 3D image data. The ray is sampled at regular intervals throughout the 3D image and the pixel value corresponding to the ray is computed from the samples according to a rendering ray transform. Useful rendering ray transforms include selecting the sample with the highest value, and computing a simulated light interaction with samples using the local data gradient. Techniques for rendering of 3D data are well known in the art and are described in many publications, for example in the book "Introduction to Volume Rendering" by Lichtenbelt et al. (1998).

In one embodiment the rendering transform is determined so that the 2D projections (i.e. 116 and 118 of FIG. 1) contain a predetermined structure. The structure may be an anatomical structure such as bone, blood vessels or other types of tissues or organs, such as skin or muscles. Since bones have similar shapes and spatial arrangements in different individuals, and their HU values are always higher than surrounding fat and muscle tissue, they are good "anchors" for inter-patient registration.

Figure 2:
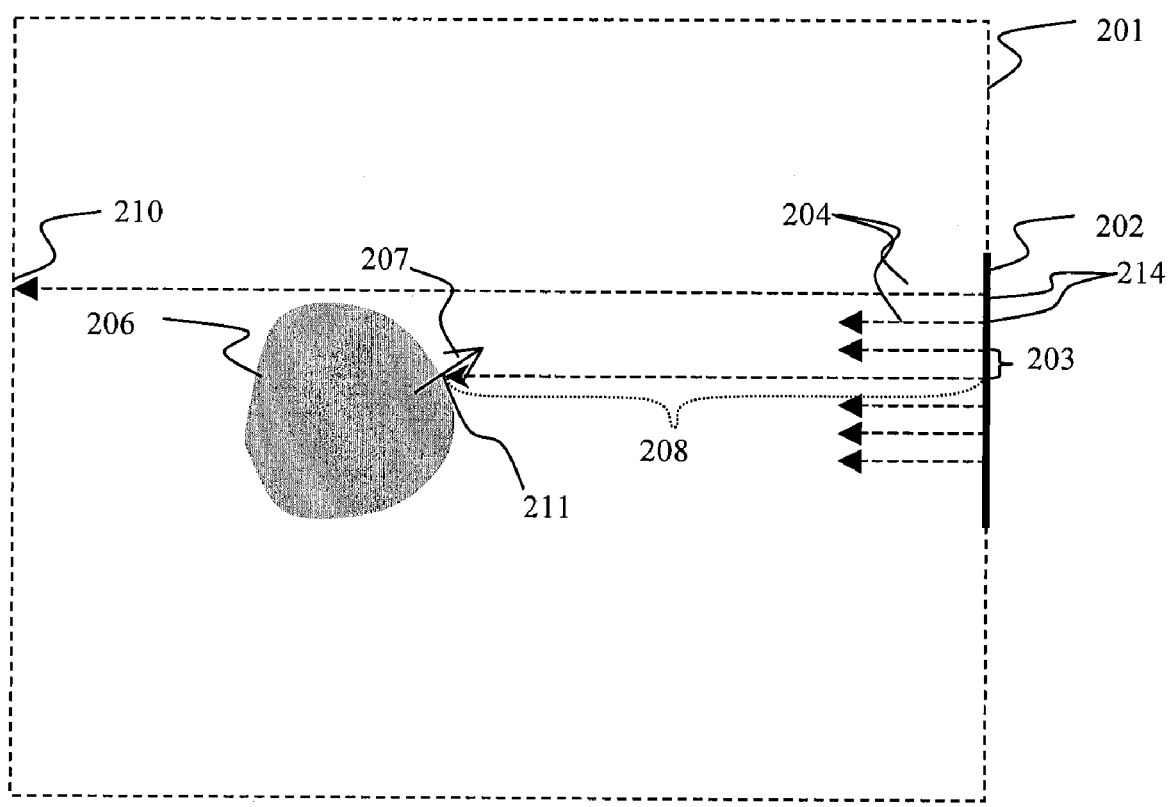
FIG. 2 is a sectional representation illustrating a rendering transform in accordance with an embodiment of the present invention.

Reference is now made to FIG. 2 wherein a rendering transform in accordance with an embodiment of the present invention is applied to a trans-axial 2D slice image 201 of a 3D image. A typical 3D image generated by a CT or magnetic resonance imaging (MRI) scanner is comprised of a stack of parallel 2D slice images, oriented perpendicular to the long axis of the patient body (trans-axial slices), with the front of the patient body or head facing one of the sides of the image. Although the rendering algorithm must be applied to every 2D slice image, for ease of explanation the application of a rendering transform to a 3D image will be explained in relation to a single 2D slice image 201.

In the exemplary embodiment shown in FIG. 2 a projection plane 202, represented by an intersection line through the slice, is aligned with an edge of the 2D slice image 201. In one embodiment the projection plane 202 is selected to be parallel to one of the side faces of the 3D image such that when the 3D image is a CT or MRI scan of the patient, the projection plane 202 corresponds with a front, back, left side or right side view of the patient. Where the 3D images are generated by a medical scanner, such as a CT scanner, the particular view (front, back, left side or right side) desired can easily be located using the DICOM descriptor information. In cases where the descriptor indicates a patient orientation which is not aligned with the coordinate axes of the 3D image, trans-axial slice image 201 may represent a plane that is at an oblique angle to the coordinate axes of the 3D image.

Rays 204 are cast into each 2D slice image 201 at every pixel spacing increment 203 in the direction perpendicular to the projection plane 202. As noted above, each ray represents a pixel 214 in the 2D projection. The increment 203 may be selected such that the registration quality is maximized and the processing time minimized. In one embodiment the increment 203 is set to 1 mm.

Each ray 204 is sampled at regular intervals throughout the 2D slice image 201 and the sample value is compared to a threshold value to determine if the sample point corresponds to a particular structure. For example, since bone typically has a HU value of 150 or greater, if the particular structure being sought is bone then the threshold value would be 150. In the exemplary embodiment shown in FIG. 2, the 2D slice image 201 contains a bony structure 206 having higher HU values than its surroundings. Accordingly, any rays 204 that intersect with the bony structure 206 will meet or exceed a 150 HU threshold.

At the point 211 a ray 204 meets or exceeds the threshold whereupon a plurality of surface parameters are calculated. Where the structure being sought is an anatomical structure such as bone, the surface parameters describe the features of the anatomical surface of the structure in a small 3D region surrounding point 211. If the ray reaches the end 210 of the 2D slice image 201 before the sample value meets or exceeds the threshold then one of the surface value parameters is assigned a special value to denote that fact. In one embodiment the surface parameters include the following four parameters: Nx, Ny, Nz and D where Nx, Ny, and Nz form a surface normal unit vector 207 derived from a 3D Zucker-Hummel operator centered around 211, and D represents the distance 208 between the projection plane 202 and the surface location 211. Other surface parameters representing curvature features, such as principal curvature radii and shape index ("COSMOS, Representation Scheme for 3D Free-Form Objects", Dorai et al, IEEE TRANSACTIONS ON PATTERN ANALYSIS AND MACHINE INTELLIGENCE, VOL. 19, NO. 10, OCTOBER 1997) may be successfully used as well, although they are more computationally expensive and more sensitive to noise. A pixel in which the threshold was not crossed is known as a background pixel and is identified by setting the D parameter to a negative value.

The plurality of surface parameters generated for each pixel of the 2D projection are stored with the 2D projection. The D surface parameter of each pixel can then be used later to map each non-background pixel back to its corresponding 3D location.

If the 2D projections are expected to contain noise and small narrow regions, such as minor blood vessels, that are often non-homologous across patients, it is advantageous to remove them from the 2D projections by performing a morphological opening of the non-background pixels. A morphological opening can generally be described as a process of removing small objects from an image and is implemented by erosion followed by dilation of the image.

Figure 3:
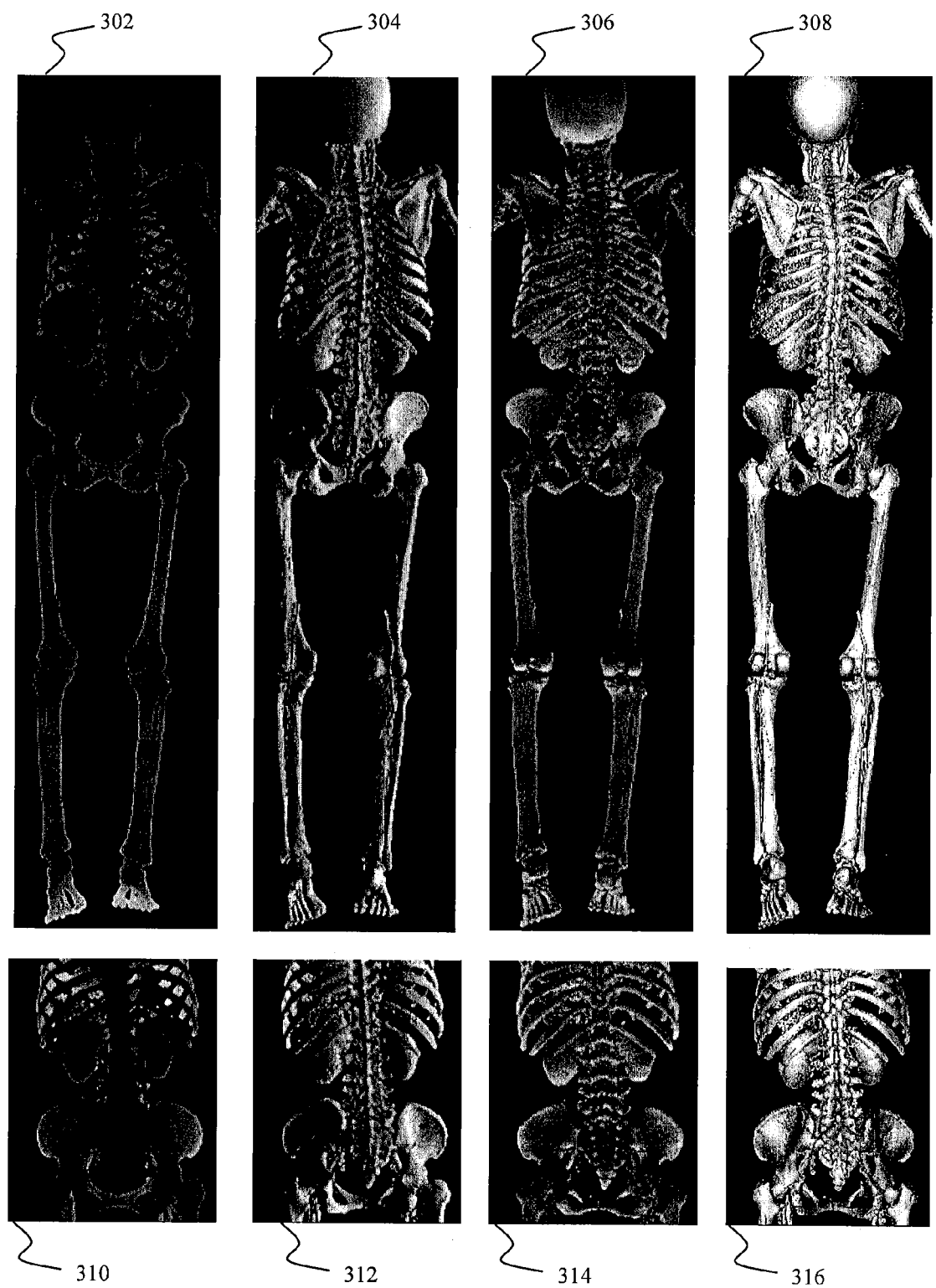
FIG. 3 shows 2D images representing the surface parameters generated from a first and second 3D image in accordance with the rendering transform described in FIG. 2.

Reference is now made to FIG. 3 wherein 2D images created from the surface parameters generated in accordance with FIG. 2 are illustrated. The top images 302, 304, 306 and 308 represent the surface parameters D, Nx, Ny, and Nz respectively generated from a second 3D image 108 of a full body in accordance with the rendering transform described in FIG. 2. Similarly, the bottom images 310, 312, 314 and 316 represent the surface parameters D, Nx, Ny and Nz respectively generated from a first 3D image 106 of a partial body. In these images the surface parameters have been scaled and shifted to allow them to be displayed such that the minimum value is shown in black and the maximum in white. Background pixels are mapped to black. A morphological opening was performed on the images to remove noise and blood vessels that do not overlay bone.

After the 2D projections 116 and 118 are generated through the rendering of the first and second 3D images 106 and 108 in steps 112 and 114, the 2D projections 116 and 118 are registered in step 120 of method 100. Registration includes determining at least one affine transform and using this at least one affine transform to initialize an iterative optimization of an elastic registration. In one embodiment the elastic registration is described by a free-form deformation. An affine transform can be broadly described as a mapping between two coordinate spaces. An implementation of an affine transform comprises a number of parameters that control the mapping. In one embodiment an affine 2D transform is controlled by the following seven parameters: TX, TY, SX, SY, RX, RY and $\theta$. TX and TY represent the translation in the lateral (x) and longitudinal (y) directions respectively. SX and SY represent the lateral and longitudinal scaling. RX and RY represent the location of a rotation centre point and $\theta$ represents the angle of rotation.

Figure 4:
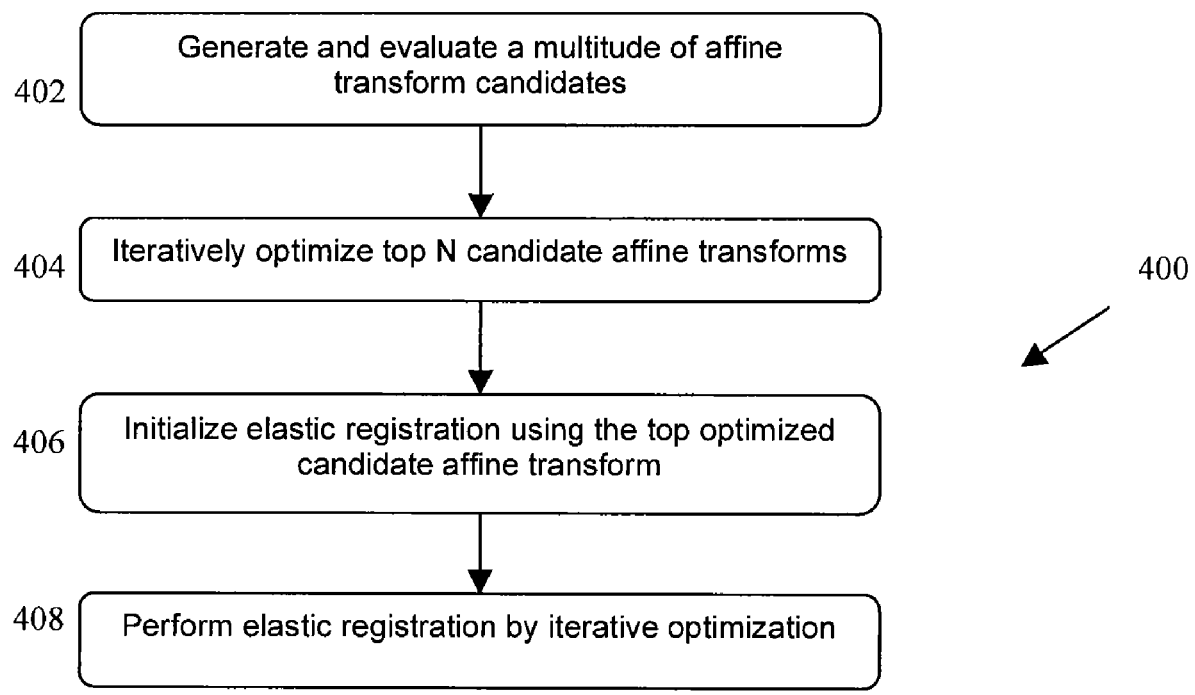
FIG. 4 is a flowchart of a method for registering two 2D projections using a single affine transform to initialize the elastic registration in accordance with an embodiment of the present invention.

Reference is now made to FIG. 4 wherein a method 400 for elastically registering two 2D projections using one affine transform is illustrated. In the first step 402 multiple candidate affine transforms are generated and evaluated. A candidate affine transform is an estimate of the correct mapping of locations from the second 2D projection 118 to analogous locations in the first 2D projection 116.

One measure of the quality of the affine transform is its corresponding similarity metric value. The similarity metric value quantifies the degree of similarity between values of pixels of the first 2D projection and the corresponding values of pixels of the second 2D projection as determined by the affine transform. Only pixel locations where at least one of the two pixel locations is not a background location are considered in computing the similarity metric. Various functions for evaluating the total similarity of the pixels across the images can be used. Common examples of such functions include cross-correlation, mutual information, mean-square difference and ratio image. In one embodiment the sum of the squared difference in one or more of the surface parameters (i.e. Nx, Ny, Nz) is used to evaluate the similarity.

In step 404 the N candidate affine transforms generated in step 402 with the highest similarity values are selected and iteratively optimized according to known iterative affine registration optimization methods. N is any integer equal to or greater than one. In one embodiment N is equal to 5.

In step 406 the optimized affine transform generated in the previous step 404 with the highest similarity value is used to initialize the parameters of the elastic registration. A number of known elastic registration approaches may be used. In one embodiment a multi-resolution free-form deformation registration is used, defined by an array of displacement vectors specified on a deformation grid of control points. The multi-resolution free-form deformation registration is described in the paper "Nonrigid registration using free-form deformations: Application to breast MR images", D. Rucker et al., in IEEE Transaction on Medical Imaging, 18(1):712-721, August 1999. In the initialization step 406, the optimized affine transform generated in previous step 404 is used to compute the displacement vector at each grid location.

In step 408 the elastic registration is iteratively optimized to further increase the similarity metric. In one embodiment the elastic registration is optimized using gradient descent with a distortion penalty term incorporated into the similarity measure to prevent excessive warp or folding of the deformation grid.

Since an affine transform comprises multiple parameters, each of which can accept a wide range of values, the number of candidate affine transforms to evaluate in step 402 in order to ensure success in subsequent steps can be very large. Accordingly, it would be advantageous to develop a method of generating a limited number of candidate affine transforms that includes candidate affine transforms that are likely to produce a good elastic registration and excludes candidate affine transforms that are unlikely to produce a good elastic registration.

Figure 5:
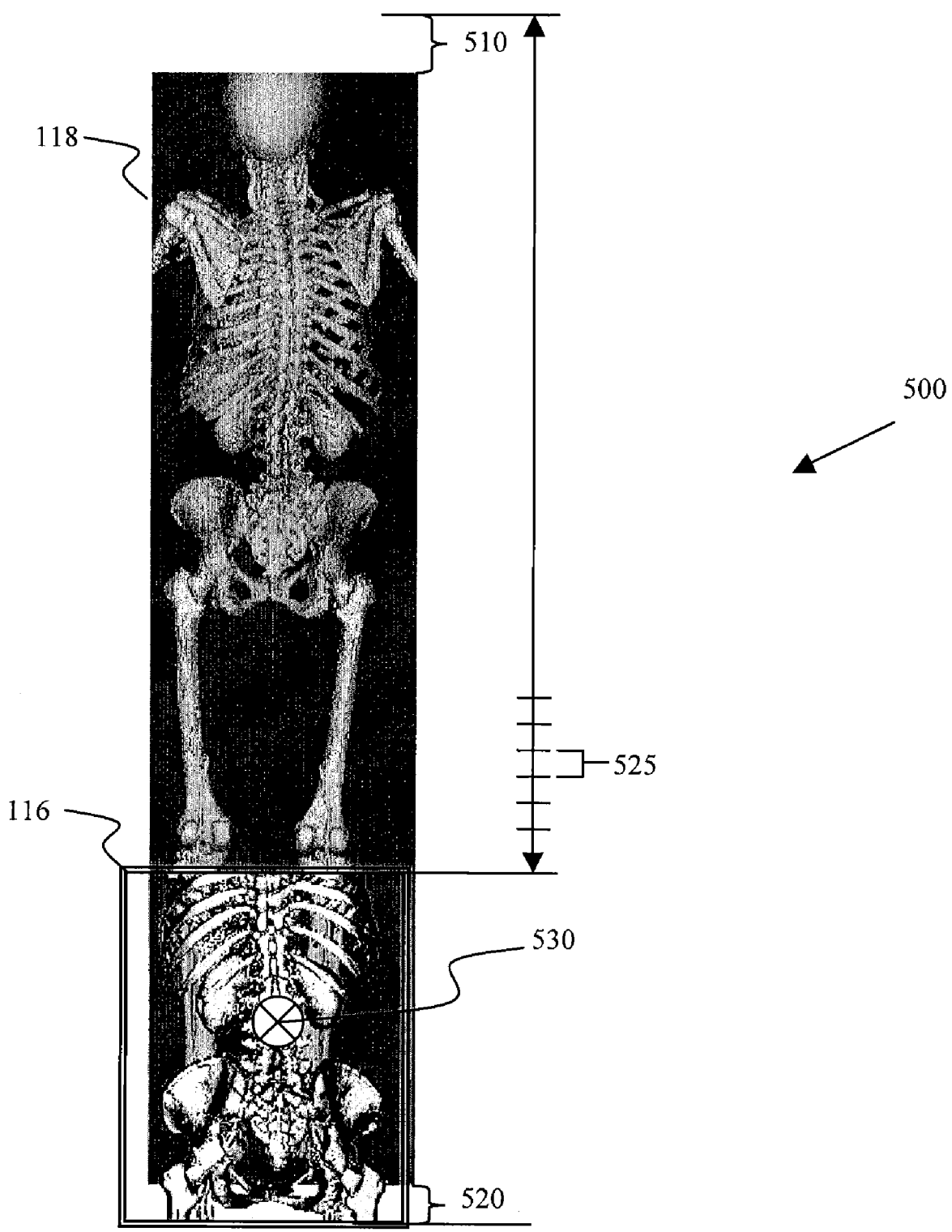
FIG. 5 illustrates a method for generating multiple candidate affine transforms in accordance with an embodiment of the present invention.

Reference is now made to FIG. 5 wherein a method 500 of generating a limited number of candidate affine transforms in accordance with an embodiment of the present invention is illustrated. Where the first and second 3D images 106 are images of a human body only a limited number of values for the affine transform parameter $\theta$ need to be evaluated since the orientation of the longitudinal axis of the bodies shown in the first and second 3D images and corresponding 2D projections is made similar by the rendering process. However, a full range of longitudinal translations (TY) needs to be evaluated.

To generate candidate affine transforms for a full range of longitudinal translations (TY) the longitudinal axis of the second 2D projection and is divided into a plurality of increments 525.

At least one candidate affine transform is generated for each increment 525 of the longitudinal axis. The longitudinal translation parameter (TY) of the affine transform is set to the increment value and the remaining affine parameters are generated by comparing a region of the first 2D projection to a region of the second 2D projection and adjusting the affine transform parameters to maximize the similarity value of these two regions. The regions of the 2D projections selected for the comparison are based on the particular longitudinal axis increment being evaluated.

In one embodiment the process of generating candidate affine transforms further comprises aligning the longitudinal axis of the first 2D projection 116 and the longitudinal axis of the second 2D projection 118. The first 2D projection 116 is then shifted along the longitudinal axis of the second 2D projection increment by increment such that for each increment a region of the first 2D projection 116 overlaps with a region of the second 2D projection 118. It is the overlapping regions of the two 2D projections at a specific increment that are compared to determine the affine transform parameters for that specific increment.

This embodiment can be alternatively described in the following manner. The first and second 2D projections 116 and 118 each have a top edge and a bottom edge. The bottom edge of the first 2D projection 116 is aligned with the bottom edge of the second 2D projection 118 such that a region of the first 2D projection 116 overlaps with a region of the second 2D projection 118. The first 2D projection 116 is then shifted along the longitudinal axis of the 2D projection one increment at a time. For each increment there are different overlapping regions of the first 2D projection and the second 2D projection. It is the overlapping regions of the first and second 2D projections at each increment that are compared to determine the affine transform parameters for that specific increment.

In another embodiment a first margin 510 and a second margin 520 are defined to allow the first 2D projection 116 to extend outside the top and bottom edges of the second 2D projection 118 during shifting. This is necessary in cases where not all of the contents of the first 2D projection 116 can be found in the second 2D projection 118. For example, if the second 2D projection 118 contains a skeleton that goes from shoulders to feet and the first 2D projection 116 contains a skeleton that goes from head to mid-chest, the method should be able to compare the bottom part of the first 2D projection 116 with the top part of the second 2D projection 118. Accordingly, if the second 2D projection 118 is known to cover the full body then it is not likely that the entire contents of the first 2D projection 116 will not be found so the first and second margins 510 and 520 can be small. Otherwise the first and second margins need to be large (e.g. half the height of the first 2D projection 116).

In one embodiment the remaining affine parameters are generated in the following manner. The average lateral (x) co-ordinate of the non-background pixels in the overlapping region of the first 2D projection 116 and the average lateral (x) co-ordinate of the non-background pixels in the overlapping region of the second 2D projection 118 are computed and the lateral translation parameter (TX) is selected to align the two averaged lateral (x) co-ordinates. The lateral rotation center parameter (RX) and the longitudinal center parameter (RY) are set to the center 530 of the overlapping region of the second 2D projection 118. A small number of values around one for the lateral scaling parameter (SX) and the longitudinal scaling parameter (SY) are evaluated. A small number of values around zero, eg, {−2, 0, 2} degrees, are evaluated for θ. The affine transform parameters resulting in the highest similarity value for the given TX are saved for further processing.

In one embodiment each increment is equal to a single projection pixel. To reduce the time and processing power required to compute the similarity metrics for the candidate affine transforms, the resolution of the first and second 2D projections 116 and 118 may be reduced by averaging every n×n pixel block where n is equal to any integer greater than one. In one embodiment where the projection pixel size is 1 mm, n is equal to 4, resulting in each reduced pixel representing a 4×4 mm region.

Figure 6:
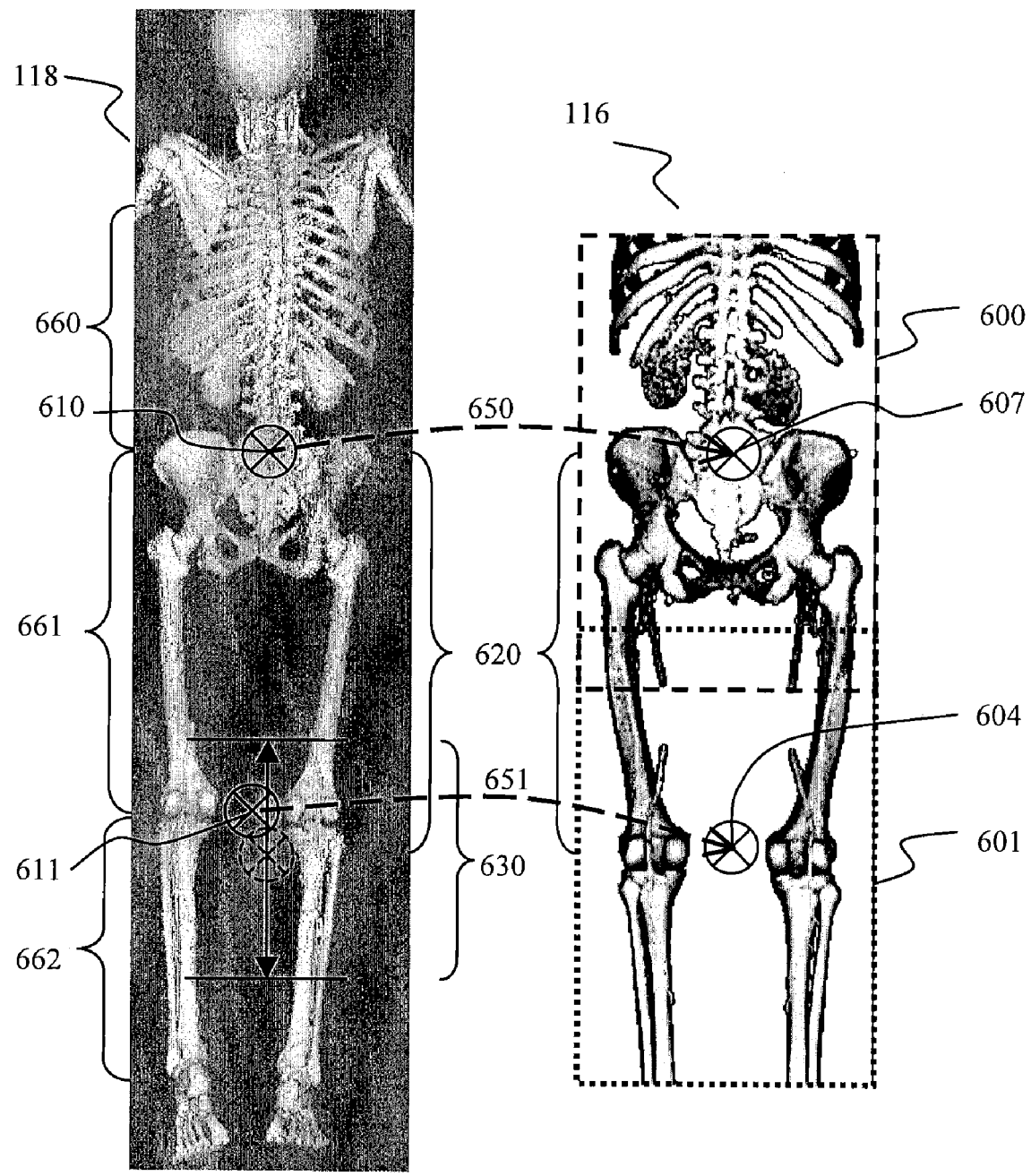
FIG. 6 is a graphical representation of a method for generating a plurality of candidate affine transforms for two separate regions of a first 2D projection in accordance with an embodiment of the present invention.
Figure 7:
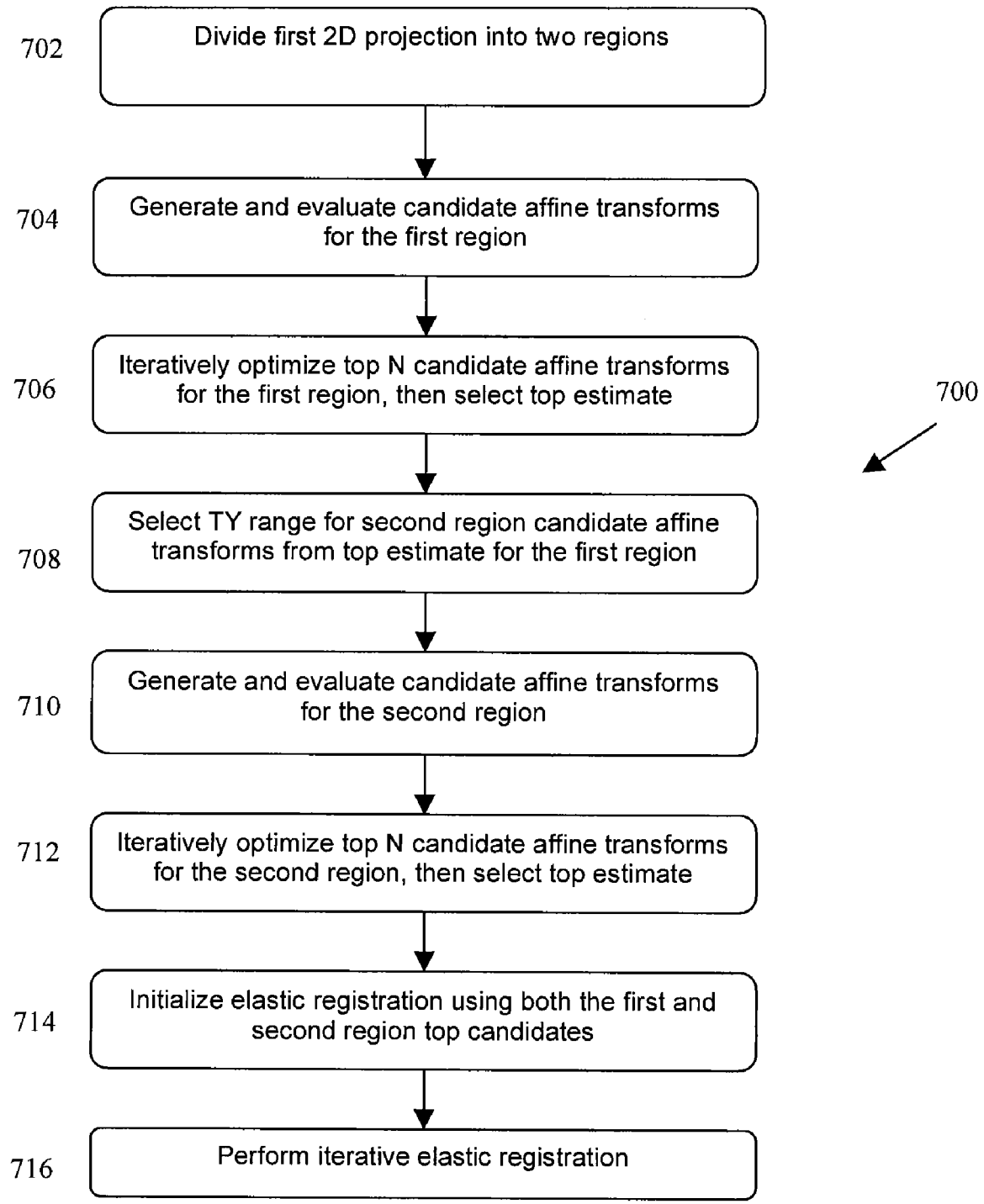
FIG. 7 is a flowchart of a method for registering two 2D projections using two affine transforms to initialize the elastic registration in accordance with an embodiment of the present invention.

Reference is now made to FIGS. 6 and 7 wherein a method for registering two 2D projections using two global affine transforms is illustrated. Where the first 2D projection 116 exceeds a certain size it may be necessary to obtain more than one affine transform to produce a good global registration. In one embodiment multiple affine transforms are required where the height of the first 2D projection 116 exceeds 70 cm. In step 702 the first 2D projection 116 is divided into a first region 600 and a second region 601 such that the first and second regions 600 and 601 are not co-extensive. In the exemplary embodiment shown in FIG. 6, the first region 600 is the upper portion of the first 2D projection 116 and the second region is the lower portion of the first 2D projection 116. As shown in FIG. 6, the first and second regions 600 and 601 may be overlapping.

In step 704 a number of candidate affine transforms are generated for mapping locations in the second 2D projection 118 to locations in the first region 600 of the first 2D projection 116. In one embodiment the candidate affine transforms are generated in accordance with the method described in relation to FIG. 5.

In step 706 the top N candidate affine transforms generated in step 704 for the first region 600 of the first 2D projection 116 are iteratively optimized and the candidate affine transform with the highest similarity value is selected and designated the first region affine transform 650.

In step 708 a sub-set of the increments used in step 704 to generate the candidate affine transforms for the first region is created for generating candidate affine transforms for the second region 601 of the first 2D projection 116. The sub-set of increments is based on the first region affine transform 650 selected in the previous step 706. The first step is to calculate the longitudinal distance 620 between the centre 607 of the first region 600 of the first 2D projection 116 and the centre 604 of the second region 601 of the first 2D projection 116. The second step is to map the centre 607 of the first region 600 of the first 2D projection 116 back to location 610 of the second 2D projection 118 using the inverse of the first region affine transform 650 selected in the previous step 706. The sub-set of increments is then deemed to include those increments of the longitudinal axis of the second 2D projection 118 that fall between location 610 and the distance 620 between the centers 607 and 604 plus a tolerance range 630. The tolerance range may be proportional to the distance 620 between the centers 607 and 604. In one embodiment the tolerance is between 0.8 and 1.3 of the distance 620 between the centers 607 and 604.

In step 710 candidate affine transforms are generated for the second region 601 of the first 2D projection 118 for each increment in the sub-set of increments generated in the previous step 708. In one embodiment the candidate affine transforms for the second region 601 of the first 2D projection 116 are generated in accordance with the method described in relation to FIG. 5.

In step 712 the top N candidate affine transforms generated in the previous step 710 are iteratively optimized and then the optimized candidate affine transform with the highest similarity value is selected and designated the second region affine transform 651.

In step 714 the elastic registration is initialized using the first and second affine transforms 650 and 651 selected in steps 706 and 714. In one embodiment the initialization involves the following steps. First, using the inverse of the first and second region affine transforms 650 and 651, the first region 600 centre 607 and the second region 601 centre 604 of the first 2D projection 116 are mapped back to locations 610 and 611 in the second 2D projection 118. Displacement vectors for grid locations in the second 2D projection that fall in the region 660 above location 610 are mapped using the first region affine transform 650. Displacement vectors for grid locations in the second 2D projection that fall in the region 662 below location 611 are mapped using the second region affine transform 651. Displacement vectors for grid locations that fall in the region 661 between locations 610 and 611 are mapped using a proportionally weighted blend of the first region affine transform 650 and the second region affine transform 651.

Once fully initialized, the elastic registration is iteratively optimized in step 716 using known methods. Some of these optimization methods were previously mentioned in relation to method 400.

The number of locations mapped between the second 3D image 108 and the first 3D image 106 can be increased by generating multiple 2D projections for each 3D image. For example, one 2D projection may be generated for each of the main views (front, back, left and right). Other views that could be generated include the four intermediate diagonals (front-left, front-right, back-left and back-right).

Figure 8:
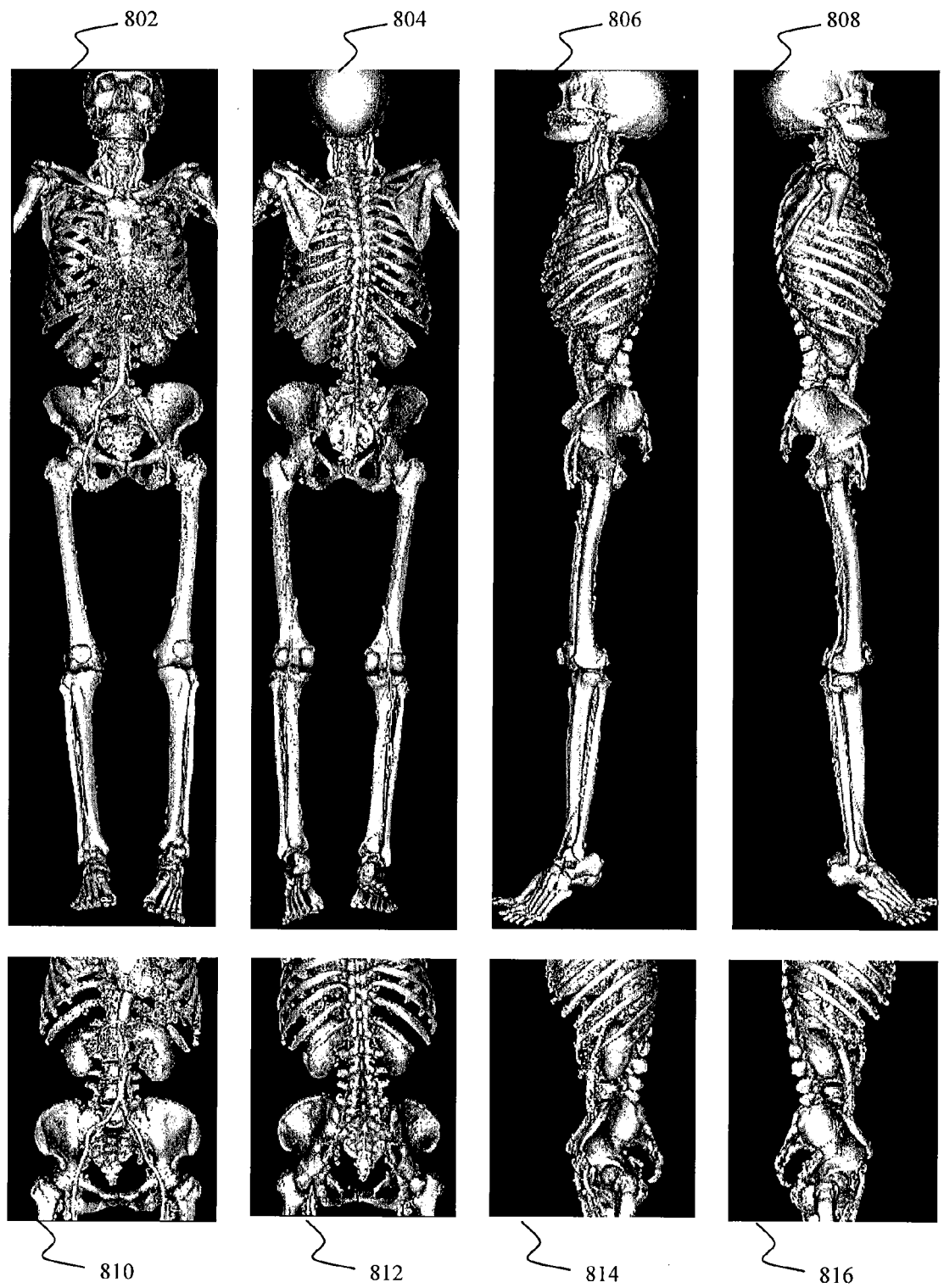
FIG. 8 illustrates the four main views of a single anatomical 3D image.

Reference is now made to FIG. 8 wherein front, back, left and right views of a first and second 3D volume are illustrated. 2D images 802, 804, 806 and 808 correspond to a 3D volume of a whole body. 2D image 802 represents the front view, 2D image 804 represents the back view, 2D image 806 represents the left side view and 2D image 808 represents the right side view. 2D images 810, 812, 814 and 816 correspond to a 3D volume of a portion of a body and represent the front, back, left side and right side views respectively.

To generate the plurality of 2D projections (i.e. 2D projections 802, 804, 806 and 808) rendering transforms are determined for each view then applied to the 3D images. An elastic registration, initialized by one or more affine transforms, is then generated for each view.

As stated above, each affine transform comprises a plurality of parameters. In one embodiment the affine transform parameters include seven parameters: a lateral translation parameter (TX), a longitudinal translation parameter (TY), a lateral scaling parameter (SX), a longitudinal scaling parameter (SY), a lateral rotation centre parameter (RX,) a longitudinal rotation center parameter (RY) and rotation angle parameter (θ). Experimentation has indicated that a number of relationships exist between the affine transform parameters of different views. First, the longitudinal translation parameter (TY) and the longitudinal scaling parameter (SY) will be similar for all views. Second, the lateral scaling parameter (SX) and longitudinal rotational center parameter (RY) will be similar for opposite views. Examples of opposite views include front and back, and left and right. Third, the rotation angle parameter (θ) of one view will be very similar to the negation of the rotation angle parameter (θ) of the opposite view. Fourth, the lateral rotation centre parameter (RX) will be very similar to the width of the 2D projection minus the lateral rotation center parameter (RX) of the opposite view.

The affine transforms corresponding to the multiple views can be iteratively optimized by taking advantage of these similarity relationships between affine parameters. The following pseudo-code illustrates one way in which this iterative optimization can be implemented to direct the adjustment of parameters of different views during optimization iterations towards convergence on values consistent with these relationships:

Generate an affine transform for each view;
Loop N times
  Replace the TY, SY of each view by TY, SY averaged over all the views;
  Replace the SX, RY of each view by SX, RY averaged over the given view and its opposite;
  Replace the θ parameter of each view by its average with −θ of its opposite view;
  Replace the RX parameter of each view by its average with (image A width—RX) of its opposite view;
  Optimize the affine transform of each view separately;
End loop;

N is any integer greater than 1. In one embodiment N is equal to 5. In a further embodiment the averages calculated in each iteration are weighted averages based on the similarity value of the affine transform such that affine transforms with a lower similarity value contribute less to the average.

Once the affine transformations have been optimized using the above process an elastic registration is initialized and iteratively optimized for each view separately.

Generating and registering multiple 2D projections from each 3D image also allows a region of interest to be isolated. For example, a clinician may be interested in isolating and analyzing a region of the anatomy, for example a single bone, a kidney or the liver.

Figure 9:
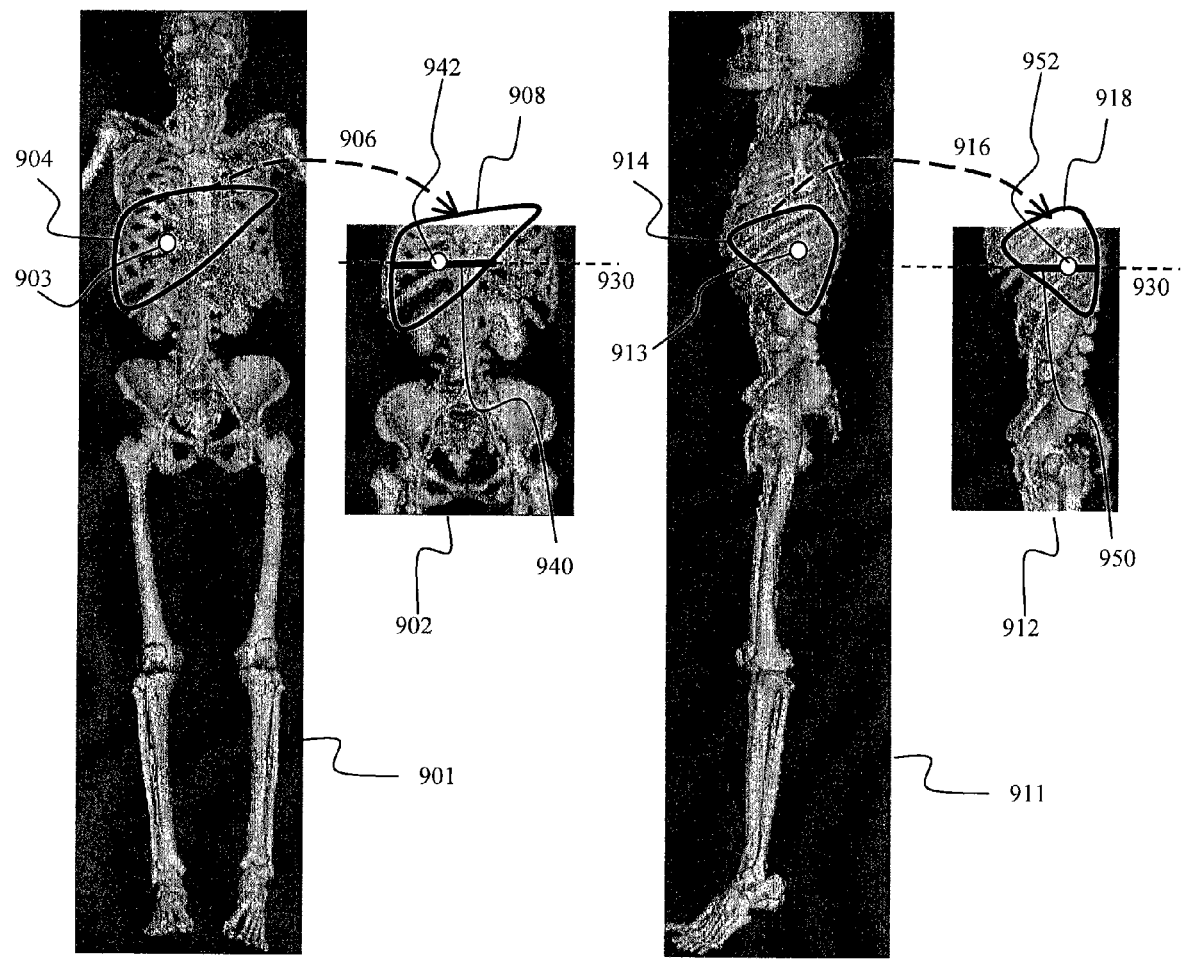
FIGS. 9 and 10 illustrate a method by which a region of interest can be isolated using contours and/or marked positions in accordance with an embodiment of the invention.
Figure 10:
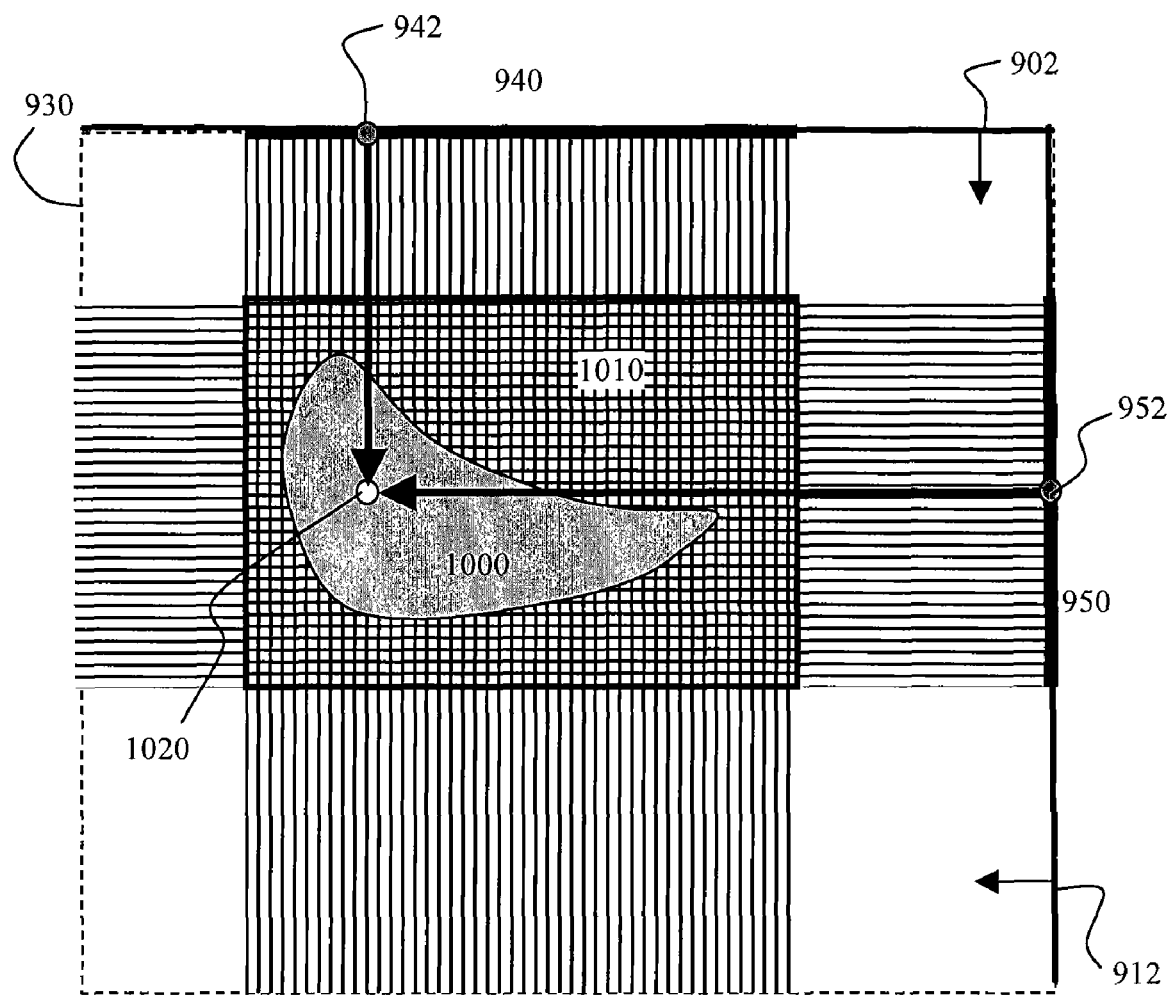

Reference is made to FIGS. 9 and 10 wherein a method of isolating a region of interest using contours and/or marked positions is illustrated. In FIG. 9 a first 2D projection 901 representing the front view of the second 3D image 108 and a second 2D projection 911 representing the left side view of the second 3D image 108 are generated. Similarly, a first 2D projection 902 representing the front view of the first 3D image 106 and a second 2D projection 912 representing the left side view of the first 3D image 106 are also generated.

The first and second 2D projections 901 and 911 of the second 3D image 108 include projection contours 904 and 914, which represent the region of the liver. These contours are drawn manually on the first and second 2D projections 901 and 911, based on anatomical knowledge of the location of the liver relative to the skeleton. The contour information is stored together with the 2D projection data corresponding to each 2D projection.

The first 2D projection 901 of the second 3D image 108 and the first 2D projection 902 of the first 3D image 106, and the second 2D projection 911 of the second 3D image 108 and the second 2D projection 912 of the first 3D image 106 are registered in accordance with the methods described herein. The contours 904 and 914 are then mapped from the first and second 2D projections 901 and 911 of the second 3D image 108 to the first and second 2D projections 902 and 912 of the first 3D image 106 resulting in contours 908 and 918 respectively. It should be clear to one skilled in the art that the mapped contours 908 and 918 do not need to be contained fully in the 2D projections 902 and 912.

The mapped contours 908 and 918 may further be used to generate a contour extrusion intersection sub-volume which encloses the region of interest (i.e. the region of the liver). The sub-volume is defined by the intersection in 3D of the mapped contours 908 and 918 extruded in the direction of the rendering projection. The sub-volume generation is illustrated in FIG. 10 using a 2D slice 930 of the first 3D image 106. The region enclosed by the mapped contours 908 and 918 intersect the 2D slice 930 along lines 940 and 950 respectively. Line segments 940 and 950 are then extruded in the projection direction. Region 1010 is the intersection of the extrusions and includes a region 1000 representing the region of interest (i.e. the region of the liver). Once the region of interest is isolated and separated by this method from other regions of similar intensity and size, such as when the liver region is separate from most of the pancreas, the stomach and the spleen regions, the region of interest can subsequently be more accurately segmented using thresholding and then applying mathematical morphology operators to the sub-volume, such as opening, region growing and selection of the largest component.

The 2D projections 901 and 911 generated from the second 3D image 108 may contain, in addition to the contours 904 and 914 or in place of the contours 904 and 914, manually marked positions 903 and 913. These manually marked positions are positions that are likely to be located within a region of interest (e.g., the liver). The marked positions 903 and 913 in the first and second 2D projections 901 and 911 of the second 3D image 108 are mapped through the registration process described above to positions 942 and 952 in the first and second 2D projections 902 and 912 respectively. The intersection point 1020 of the projections of positions 942 and 952 in 3D may be used as a seed for segmentation algorithms using region growing. Segmentation in the context of digital imaging is the process of partitioning a digital image into multiple regions and is typically used to locate objects and boundaries. Segmentation using region growing involves starting a region with a single pixel. Adjacent pixels are recursively examined and added to the region if they are sufficiently similar to the region. Segmentation using seeded region growing is described in further detail in R. K. Justice et al., "Medical image segmentation using 3D seeded region growing", Proc. SPIE Vol. 3034, p. 900-910, Medical Imaging 1997: Image Processing, Kenneth M. Hanson; Ed., April 1997. Where the projections of positions 942 and 952 do not directly intersect in 3D as shown in FIG. 10, the intersection point 1020 may be selected as the mid-point of the shortest line segment between the projection lines.

Depending on the purpose of the registration, the contour extrusion intersection sub-volume may undergo a secondary registration with an atlas of the region of interest (e.g., liver) to produce a more accurate definition of the region of interest (e.g., liver). The registration may be performed directly in 3D, as is known in the art, or may be performed in accordance with the registration methods described herein. The computational savings of performing registration in accordance with the described embodiments over a direct 3D registration are reduced for this secondary registration since the region being registered is relatively small.

The contour/marked position method of isolating a region of interest is particularly useful when a clinician wants to isolate a soft tissue region of the anatomy (e.g., liver) when the rendering transform is selected so that the 2D projections contain bone structures.

Figure 11:
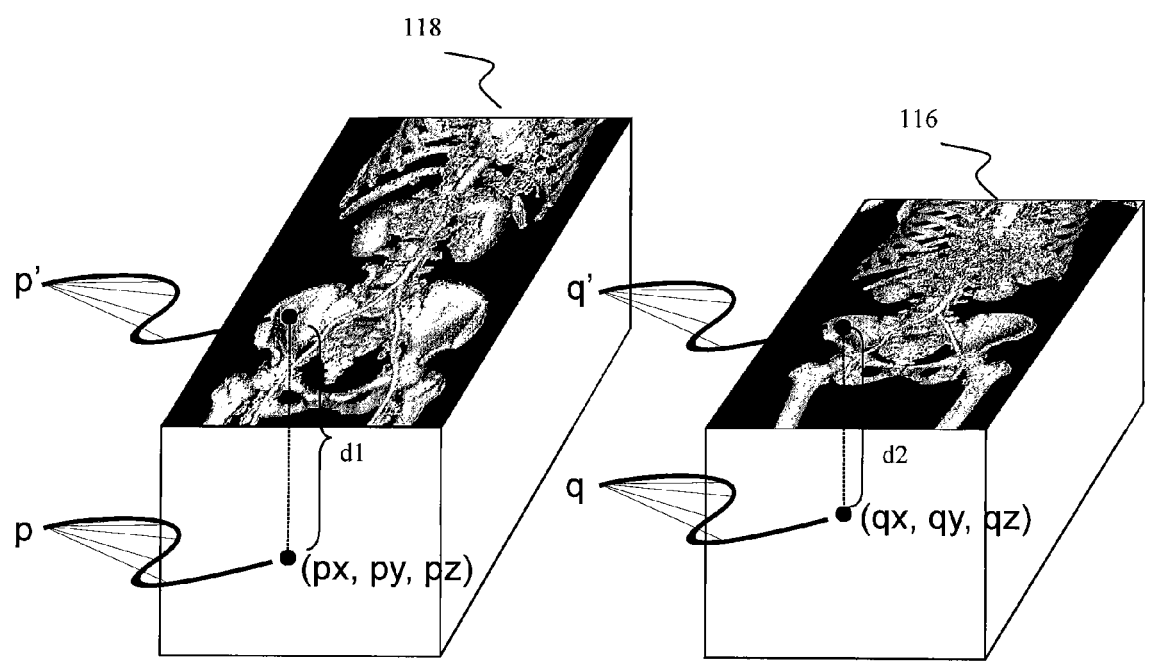
FIGS. 11 and 12 illustrate a method by which the results of the registration of one or more 2D projection pairs can be used to initialize a 3D elastic registration.
Figure 12:
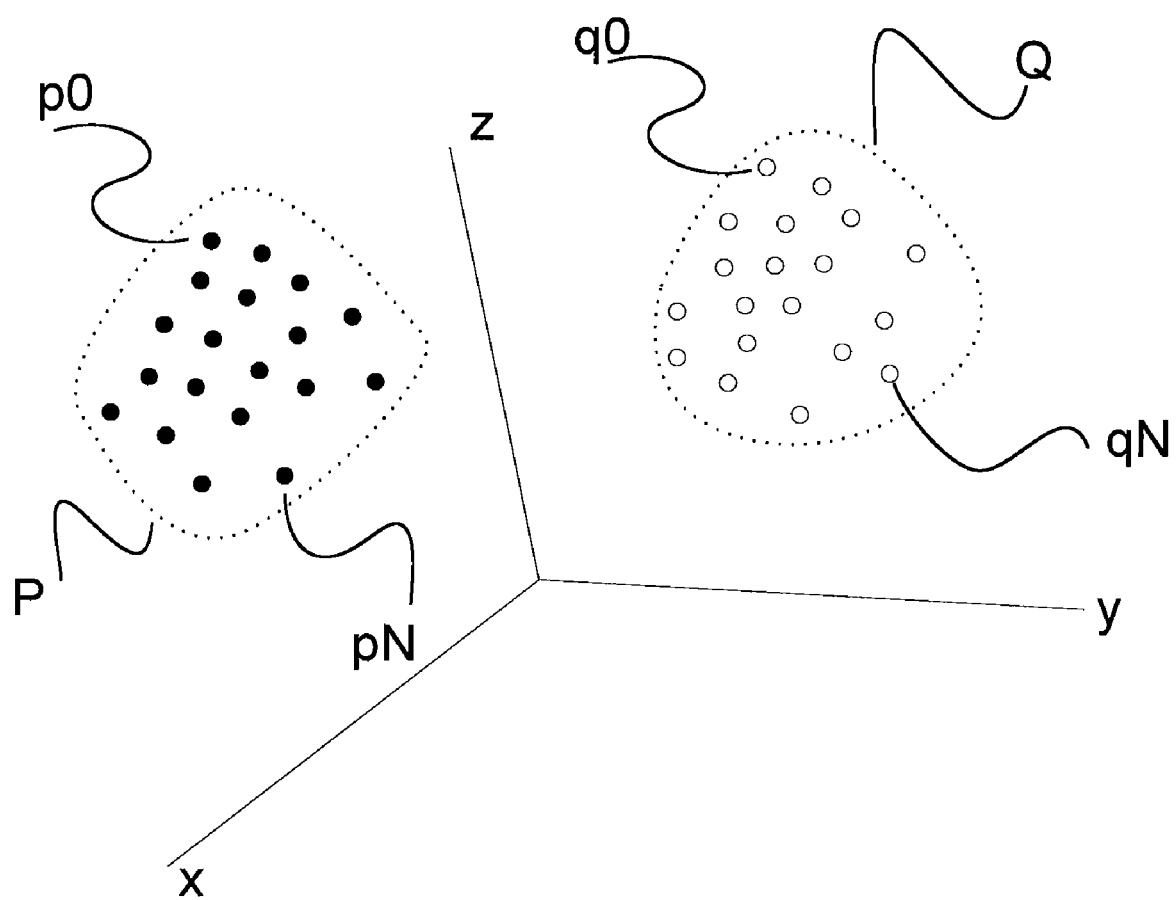

Elastic registration of one or more 2D projections generated in accordance with any of the described embodiments may further be used to initialize registration of the corresponding 3D images. Reference is now made to FIGS. 11 and 12 wherein a method of using the results of at least one 2D projection registration to initialize a 3D elastic registration is illustrated. If during the rendering process the depth, d, to a specified threshold value (i.e. HU) is stored for each pixel in the 2D projection then each of the pixels in the 2D projection can be mapped to a 3D location defined by coordinates (x, y, z). For example, point p' in a 2D projection 118 derived from a second 3D image 108 can, using the distance value d1, be mapped to 3D location p defined by co-ordinates (px, py, pz). Similarly the homologous point q' in a 2D projection 116 derived from a first 3D image 106 can, using the distance value d2, be mapped to 3D location q defined by co-ordinates (qx, qy, qz). The 3D locations generated from the 2D projection 118 form a set P. Similarly, the 3D locations generated from 2D projection 116 form a set Q. The relationship between P and Q is derived from the registration of 2D projection 118 and 2D projection 116 and is used to initialize the 3D registration.

The initialization may involve the following steps. First, a 3D transformation, T_global, is generated to best match P and Q. The transformation comprises a global affine transform and a local free-form deformation. The global affine transform is an affine transform which accounts for the bulk difference between the point sets P and Q. The global affine transform is calculated by minimizing the mean squared value of the distance between the mapped positions of points in set P with the position of points in set Q. The residual non-affine component is estimated by T_local. T_local is similarly calculated by minimizing the mean squared value of the residual distances between the mapped positions of points in set P with the points in set Q. Once the transform has been initialized, it can be provided as input to the 3D volumetric registration algorithm.

Algorithms for computing T_global and T_local are described in B. K. P. Horn, "Closed-form solution of absolute orientation using unit quaternions", Journal of the Optical Society of America, 4:629-642, April 1987 and S. Lee et al., "Scattered data interpolation with multilevel B-splines", IEEE Transactions of Visualization and Computer Graphics, 3(3): 228-244, July-September 1997 respectively.

Figure 13:
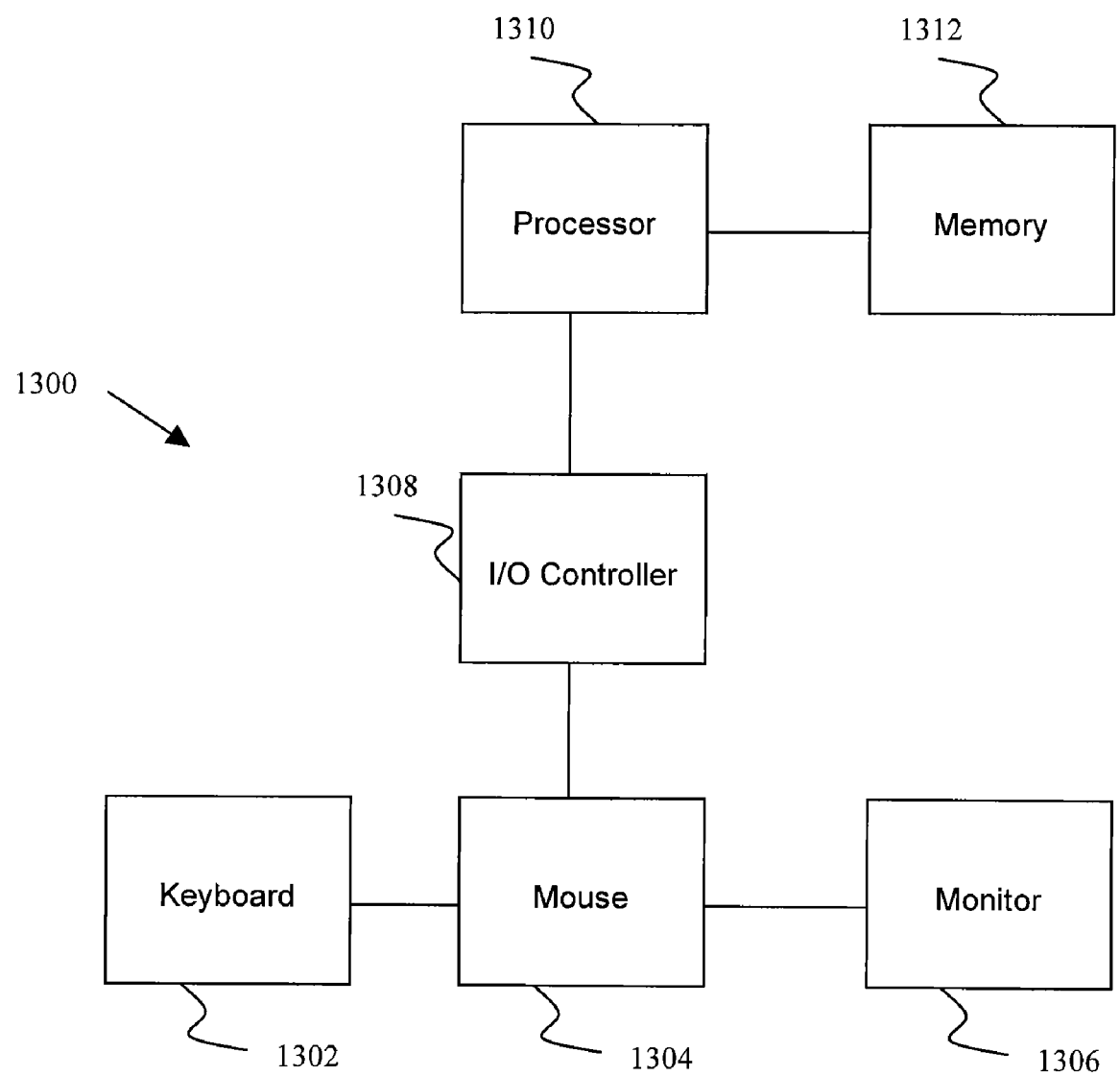
FIG. 13 is a block diagram of a computer system for implementing an embodiment of the invention.

Reference is now made to FIG. 13 wherein a block diagram of a computer system 1300 suitable for implementing an embodiment of the present invention is illustrated. Specifically, the computer system 1300 comprises a processor 1310 connected to memory 1312. The memory 1213 may be random access memory (RAM). The processor 1310 is also connected to an input/output controller 1308, which controls access to a keyboard 1302, mouse 1304 and monitor 1306.

In accordance with an aspect of the invention, the processor 1310 is configured to implement an embodiment of the invention. In this case, a first and second 3D image 106 and 108 would be stored in memory 1312. Then, the processor 1310 would perform steps on the first and second 3D images 106 and 108, analogous to the steps described in relation to FIG. 1, to register data of the first 3D image 106 with data of the second 3D image 108. In accordance with another aspect of the present invention, a computer program product is provided comprising a recording medium on which is recorded a program for suitably configuring the processor 1310 to perform these steps.

The embodiments described herein have been shown and described by way of a number of examples. It will be apparent to those skilled in the art that changes and modifications to the described embodiments may be made without departing from the substance and scope of the described embodiments, as defined in the appended claims.

The invention claimed is:

1. A method for registering 3D image data, the method comprising:
   a) receiving a first 3D image and a second 3D image;
   b) determining at least one rendering transform for applying to each of the first 3D image and the second 3D image;
   c) applying the at least one rendering transform to i) the first 3D image to provide at least one 2D projection corresponding to the first 3D image and ii) the second 3D image to provide at least one 2D projection corresponding to the second 3D image;
   d) marking one or more locations in the at least one 2D projection corresponding to the second 3D image such that the one or more locations in the at least one 2D projection correspond to one or more locations in the second 3D image;
   e) determining at least one elastic registration for mapping the one or more locations in the at least one 2D projection corresponding to the second 3D image to homologous one or more locations in the at least one 2D projection corresponding to the first 3D image, wherein determining each of the at least one elastic registration comprises:
      i) generating a plurality of candidate mappings wherein each candidate mapping in the plurality of candidate mappings defines a mapping of the one or more locations in the at least one 2D projection corresponding to the second 3D image to the homologous one or more locations in the at least one 2D projection corresponding to the first 3D image;
      ii) determining a plurality of similarity values, wherein for each candidate mapping in the plurality of candidate mappings the plurality of similarity values includes an associated similarity value corresponding with the quality of the registration under that candidate mapping;

iii) selecting from the plurality of candidate mappings a candidate mapping with a highest associated similarity value; and iv) initializing the elastic registration based on the candidate mapping with the highest associated similarity value;

f) mapping the one or more locations in the at least one 2D projection corresponding to the second 3D image to the homologous one or more locations in the at least one 2D projection corresponding to the first 3D image based on the at least one elastic registration; and g) mapping the one or more locations in the at least one 2D projection corresponding to the first 3D image to homologous one or more locations in the first 3D image.

2. The method as defined in claim 1 wherein b) comprises i) selecting a first structure in the first 3D image and a second structure in the second 3D image, the second structure being homologous to the first structure; and ii) determining the at least one rendering transform such that the at least one 2D projection corresponding to the first 3D image comprises the first structure, and the at least one 2D projection corresponding to the second 3D image comprises the second structure and is similarly oriented to the at least one 2D projection corresponding to the first 3D image.

3. The method as defined in claim 2 wherein the second structure in the at least one 2D projection corresponding to the second 3D image comprises the one or more locations in the at least one 2D projection corresponding to the second 3D image, and the first structure in the at least one 2D projection corresponding to the first 3D image comprises the one or more locations in the at least one 2D projection corresponding to the first 3D image, e) comprises determining the at least one elastic registration to map the one or more locations of the second structure in the at least one 2D projection corresponding to the second 3D image to the one or more locations of the first structure in the at least one 2D projection corresponding to the first 3D image; and f) comprises applying the at least one elastic registration to map additional one or more locations in the at least one 2D projection corresponding to the second 3D image other than the one or more locations of the second structure to homologous additional one or more locations in the at least one 2D projection corresponding to the first 3D image other than the one or more locations of the first structure.

4. The method as defined in claim 3 wherein the first structure and the second structure are anatomical structures.

5. The method as defined in claim 3 wherein the first structure and the second structure are anatomical structures consisting of at least one of bones, organs, and blood vessels.

6. The method as defined in claim 5 wherein the first structure comprises a first anatomical surface;

the second structure comprises a second anatomical surface;

the method further comprises, for each point of a first plurality of points in the first structure of the at least one 2D projection corresponding to the first 3D image, deriving a first surface parameter from the first anatomical surface of the first structure;

the method further comprises, for each point of a second plurality of points in the second structure of the at least one 2D projection corresponding to the second 3D image, deriving a second surface parameter from the second anatomical surface of the second structure; and e) comprises, for each point in the first plurality of points and for each point in the second plurality of points determining the at least one elastic registration based on the first surface parameter and the second surface parameter.

7. The method as defined in claim 6 wherein the method further comprises, for each point of the first plurality of points deriving a plurality of first surface parameters including the first surface parameter from the first anatomical surface of the first structure;

the method further comprises, for each point of the second plurality of points deriving a plurality of second surface parameters including the second surface parameter, from the second anatomical surface of the second structure; and e) comprises, for each point in the first plurality of points and for each point in the second plurality of points determining the at least one elastic registration based on the plurality of first surface parameters and the plurality of second surface parameters.

8. The method of claim 5 wherein the at least one 2D projection corresponding to the first 3D image has a first longitudinal axis and a first lateral axis;

the at least one 2D projection corresponding to the second 3D image has a second longitudinal axis and a second lateral axis where the second longitudinal axis is divided into a plurality of longitudinal increments; and e) comprises for each longitudinal increment in the plurality of longitudinal increments, generating a candidate mapping defined by a plurality of mapping parameters for mapping locations of the at least one 2D projection corresponding to the second 3D image to homologous locations in the at least one 2D projection corresponding to the first 3D image where generating the candidate mapping comprises aligning the first longitudinal axis with the second longitudinal axis;

shifting the at least one 2D projection corresponding to the first 3D image along the second longitudinal axis to the longitudinal increment such that a first overlap region of the at least one 2D projection corresponding to the first 3D image overlaps with a second overlap region of the at least one 2D projection corresponding to the second 3D image; and selecting the plurality of mapping parameters to maximize an associated similarity value where the associated similarity value is a measure of how similar the first overlap region is to the second overlap region under that candidate mapping; and determining the at least one elastic registration based on the candidate mapping with the highest associated similarity value.

9. The method of claim 5 wherein the at least one 2D projection corresponding to the first 3D image has a first longitudinal axis and a first lateral axis;

the at least one 2D projection corresponding to the second 3D image has a second longitudinal axis and a second lateral axis where the second longitudinal axis is divided into a plurality of longitudinal increments; and e) comprises, for each longitudinal increment in the plurality of longitudinal increments, i) generating a candidate mapping defined by a plurality of mapping parameters for mapping locations in the at least one 2D projection corresponding to the second 3D image to homologous locations in the at least one 2D projection corresponding to the first 3D image where generating the candidate mapping comprises ii) defining a first region along the first longitudinal axis of the at least one 2D projection corresponding to the first 3D image;

iii) based on the longitudinal increment, defining a second region along the second longitudinal axis of the at least one 2D projection corresponding to the second 3D image;

iv) selecting the plurality of mapping parameters to maximize an associated similarity value where the maximized associated similarity value is a measure of how similar the first region is to the second region under that candidate mapping;

after i), ii), iii) and iv), for each longitudinal increment in the plurality of longitudinal increments, determining the at least one elastic registration based on the candidate mapping with a highest associated similarity value of a plurality of maximized similarity values, wherein the plurality of maximized similarity values comprises the highest similarity value for each longitudinal increment of the plurality of longitudinal increments.

10. The method of claim 9 wherein the plurality of mapping parameters include a longitudinal scaling parameter for adjusting scaling of the at least one 2D projection corresponding to the first 3D image along the second longitudinal axis and a lateral scaling parameter for adjusting scaling of the at least one 2D projection corresponding to the first 3D image along the second lateral axis.

11. The method of claim 9 wherein
the at least one 2D projection corresponding to the first 3D image has a first resolution defined by a first number of points in the at least one 2D projection corresponding to the first 3D image;
the at least one 2D projection corresponding to the second 3D image has a second resolution defined by a second number of points in the at least one 2D projection corresponding to the second 3D image;
the method further comprises reducing the first resolution of the at least one 2D projection corresponding to the first 3D image by averaging each n×n block of points prior to determining the at least one elastic registration wherein n is any integer greater than one; and
the method further comprises reducing the second resolution of the at least one 2D projection corresponding to the second 3D image by averaging each n×n block of points prior to determining the at least one elastic registration wherein n is any integer greater than one.

12. The method of claim 5 wherein e) comprises
determining whether the at least one 2D projection corresponding to the first 3D image exceeds a specified threshold size and where the at least one 2D projection corresponding to the first 3D image exceeds the specified threshold size, dividing the at least one 2D projection corresponding to the first 3D image into a first region and a second region where the first region and the second region are not co-extensive;
determining a first elastic registration for mapping locations in the at least one 2D projection corresponding to the second 3D image to homologous locations in the first region of the at least one 2D projection corresponding to the first 3D image; and
determining a second elastic registration for mapping locations in the at least one 2D projection corresponding to the second 3D image to homologous locations in the second region of the at least one 2D projection corresponding to the first 3D image where the second elastic registration is based on the first elastic registration.

13. The method as defined in claim 3 wherein
b) comprises determining a first rendering transform and a second rendering transform of the at least one rendering transform such that the first rendering transform provides the at least one 2D projection corresponding to the first 3D image and the at least one 2D projection corresponding to the second 3D image from a first viewing direction and the second rendering transform provides the at least one 2D projection corresponding to the first 3D image from a second viewing direction, wherein the first viewing direction is a different viewing direction than the second viewing direction; and
e) comprises determining the at least one elastic registration based partly on a known geometric relation between the first viewing direction and the second viewing direction.

14. The method as defined in claim 13 wherein each elastic registration in the at least one elastic registration is defined by an associated candidate mapping from the plurality of candidate mappings, wherein each associated candidate mapping is defined by a plurality of mapping parameters and e) further comprises iteratively determining the plurality of mapping parameters for each associated candidate mapping based on a prior iteration of the plurality of mapping parameters defining that associated candidate mapping and a prior iteration of a parallel plurality of mapping parameters defining a different associated candidate mapping, wherein that associated candidate mapping defines an elastic registration for mapping locations from the at least one 2D projection corresponding to the second 3D image to the at least one 2D projection corresponding to the first 3D image provided by the first rendering transform and the different associated candidate mapping defines an elastic registration for mapping locations from the at least one 2D projection corresponding to the second 3D image and the at least one 2D projection corresponding to the first 3D image provided by the second rendering transform.

15. The method as defined in claim 14 wherein,
for each associated candidate mapping in the plurality of candidate mappings, the plurality of mapping parameters comprise an associated scaling parameter; and
in e), the associated scaling parameters of the plurality of candidate mappings are iteratively determined to converge together.

16. The method as defined in claim 3 wherein
the one or more locations in the at least one 2D projection corresponding to the second 3D image comprise a contour surrounding an area of interest; and
f) comprises mapping the contour to a homologous contour in the at least one 2D projection corresponding to the first 3D image.

17. The method as defined in claim 16 wherein the at least one 2D projection corresponding to the first 3D image comprises at least two 2D projections corresponding to the first 3D image and the method further comprises generating a contour extrusion intersection sub-volume using the contour of the at least two 2D projections corresponding to the first 3D image.

18. The method as defined in claim 16 wherein
the first structure and the second structure comprise skeletal structure;
the contour in each 2D projection of the at least one 2D projection corresponding to the second 3D image is selected to surround specific soft tissue based on a location of the specific soft tissue relative to the skeletal structure of that 2D projection such that the homologous contour for each 2D projection of the at least one 2D projection corresponding to the first 3D image surrounds the specific soft tissue of a first patient.

19. The method as defined in claim 3 wherein
g) comprises generating a seed point from an intersection in 3D of the homologous one or more locations in the at least one 2D projection corresponding to the first 3D image; and
the method further comprises h) using the seed point as a starting point for a segmentation algorithm based on region growing.

20. The method as defined in claim 1 wherein the at least one 2D projection corresponding to the first 3D image comprises at least two 2D projections and the at least one 2D projection corresponding to the second 3D image comprises at least two 2D projections, and
b) comprises determining at least two rendering transforms;
c) comprises applying the at least two rendering transforms to i) the first 3D image to provide the at least two 2D projections and ii) the second 3D image to provide the at least two 2D projections;
d) comprises marking the one or more locations in the at least two 2D projections corresponding to the second 3D image;
e) comprises determining at least two elastic registrations;
f) comprises mapping the one or more locations in the at least two 2D projections corresponding to the second 3D image to the homologous one or more locations in the at least two 2D projections corresponding to the first 3D image based on the at least two elastic registrations; and
g) comprises projecting the one or more locations in the at least two 2D projections corresponding to the first 3D image to provide at least two projection lines, wherein mapping the one or more locations in the first 3D image is based on the intersection of the at least two projection lines.

21. The method as defined in claim 1 wherein
applying the at least one rendering transform comprises determining a depth measurement corresponding to each location in the at least one 2D projection corresponding to the first 3D image; and,
g) comprises determining the one or more locations in the first 3D image based on the depth measurement corresponding to each of the one or more locations.

22. A system for registering 3D image data comprising:
a processor;
a memory for storing a first 3D image, a second 3D image, and means for configuring the processor to perform the steps of
a) determining at least one rendering transform for applying to each of the first 3D image and the second 3D image;
b) applying the at least one rendering transform to i) the first 3D image to provide at least one 2D projection corresponding to the first 3D image and ii) the second 3D image to provide at least one 2D projection corresponding to the second 3D image;
c) marking one or more locations in the at least one 2D projection corresponding to the second 3D image such that the one or more locations in the at least one 2D projection corresponding to one or more locations in the second 3D image;
d) determining at least one elastic registration for mapping the one or more locations of the at least one 2D projection corresponding to the second 3D image to homologous one or more locations in the at least one 2D projection corresponding to the first 3D image, wherein determining each of the at least one elastic registration comprises:
i) generating a plurality of candidate mappings wherein each candidate mapping in the plurality of candidate mappings defines a mapping of the one or more locations in the 2D projection corresponding to the second 3D image to the homologous one or more locations in the 2D projection corresponding to the first 3D image;
ii) determining a plurality of similarity values, wherein for each candidate mapping in the plurality of candidate mappings the plurality of similarity values includes an associated similarity value corresponding with the quality of the registration under that candidate mapping;
iii) selecting from the plurality of candidate mappings a candidate mapping with a highest associated similarity value; and
iv) initializing the elastic registration based on the candidate mapping with the highest associated similarity value;
e) mapping the one or more locations in the at least one 2D projection corresponding to the second 3D image to the homologous one or more locations in the at least one 2D projection corresponding to the first 3D image based on the at least one elastic registration; and
f) mapping the one or more locations in the at least one 2D projection corresponding to the first 3D image to homologous one or more locations in the first 3D image.

23. A non-transitory computer readable storage medium storing a computer program product for use on a computer system to register 3D image data, the computer program product comprising:
a recording medium;
means recorded on the medium for instructing the computer system to perform the steps of:
a) receiving a first 3D image and a second 3D image;
b) determining at least one rendering transform for applying to each of the first 3D image and the second 3D image;
c) applying the at least one rendering transform to i) the first 3D image to provide at least one 2D projection corresponding to the first 3D image and ii) the second 3D image to provide at least one 2D projection corresponding to the second 3D image; and
d) marking one or more locations in the at least one 2D projection corresponding to the second 3D image such that the one or more locations in the at least one 2D projection corresponding to one or more locations in the second 3D image;
e) determining at least one elastic registration for mapping the one or more locations in the at least one 2D projection corresponding to the second 3D image to homologous one or more locations in the at least one 2D projection corresponding to the first 3D image, wherein determining the elastic registration comprises:
i) generating a plurality of candidate mappings wherein each candidate mapping in the plurality of candidate mappings defines a mapping of the one or more locations in the at least one 2D projection corresponding to the second 3D image to the homologous one or more locations in the at least one 2D projection corresponding to the first 3D image;
ii) determining a plurality of similarity values, wherein for each candidate mapping in the plurality of candidate mappings the plurality of similarity values includes an associated similarity value corresponding with the quality of the registration under that candidate mapping;

iii) selecting from the plurality of candidate mappings a candidate mapping with a highest associated similarity value; and iv) initializing the elastic registration based on the candidate mapping with the highest associated similarity value;

e) mapping the one or more locations in the at least one 2D projection corresponding to the second 3D image to the homologous one or more locations in the at least one 2D projection corresponding to the first 3D image based on the at least one elastic registration; and f) mapping the one or more locations in the at least one 2D projection corresponding to the first 3D image to homologous one or more locations in the first 3D image.

* * * * *